May 14, 1929.  C. J. W. CLASEN  1,712,746
RAILWAY CAR TRUCK
Filed Nov. 18, 1927   2 Sheets-Sheet 1

INVENTOR
C. J. W. Clasen
BY
Evans & McCoy
ATTORNEYS

May 14, 1929.　　C. J. W. CLASEN　　1,712,746
RAILWAY CAR TRUCK
Filed Nov. 18, 1927　　2 Sheets-Sheet 2

INVENTOR
C. J. W. Clasen
BY
Evans & McCoy
ATTORNEYS

Patented May 14, 1929.

1,712,746

UNITED STATES PATENT OFFICE.

CLAUS J. WERNER CLASEN, OF DAVENPORT, IOWA, ASSIGNOR TO THE BETTENDORF COMPANY, OF BETTENDORF, IOWA, A CORPORATION OF IOWA.

RAILWAY-CAR TRUCK.

Application filed November 18, 1927. Serial No. 234,139.

This invention relates to railway car trucks and while it is to be understood that the invention is of quite general application to structures mounted to travel on railway tracks, the truck herein shown is particularly designed for railway freight cars.

The present invention has for its object to provide a truck in which the wheels are mounted for independent rotation, which is of simple and rugged construction and in which the independent mounting of the wheels is obtained without increase in the weight of the truck and without sacrificing strength or durability, and further to provide a truck which is easy to assemble and inexpensive to manufacture.

Further objects are to provide a truck in which rail friction, bearing friction and flange wear are reduced to a minimum and to provide a construction such that repairs to springs, wheels, brakes and other parts of the truck are greatly facilitated.

A further object is to provide a truck in which the wheels which travel on each rail are journaled in a rigid one piece side frame extending longitudinally the full length of the truck and in which the two wheel frames are securely joined together by suitable transverse connecting members.

With the above and other objects in view, the invention may be said to comprise the structure in its various forms as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which Figure 1 is a top plan view of the truck with the frame members broken away at one corner to show the axle bearings.

Figs. 6 and 7 are a fragmentary plan view and a fragmentary side elevation respectively showing another modified form of frame construction.

Figure 1:
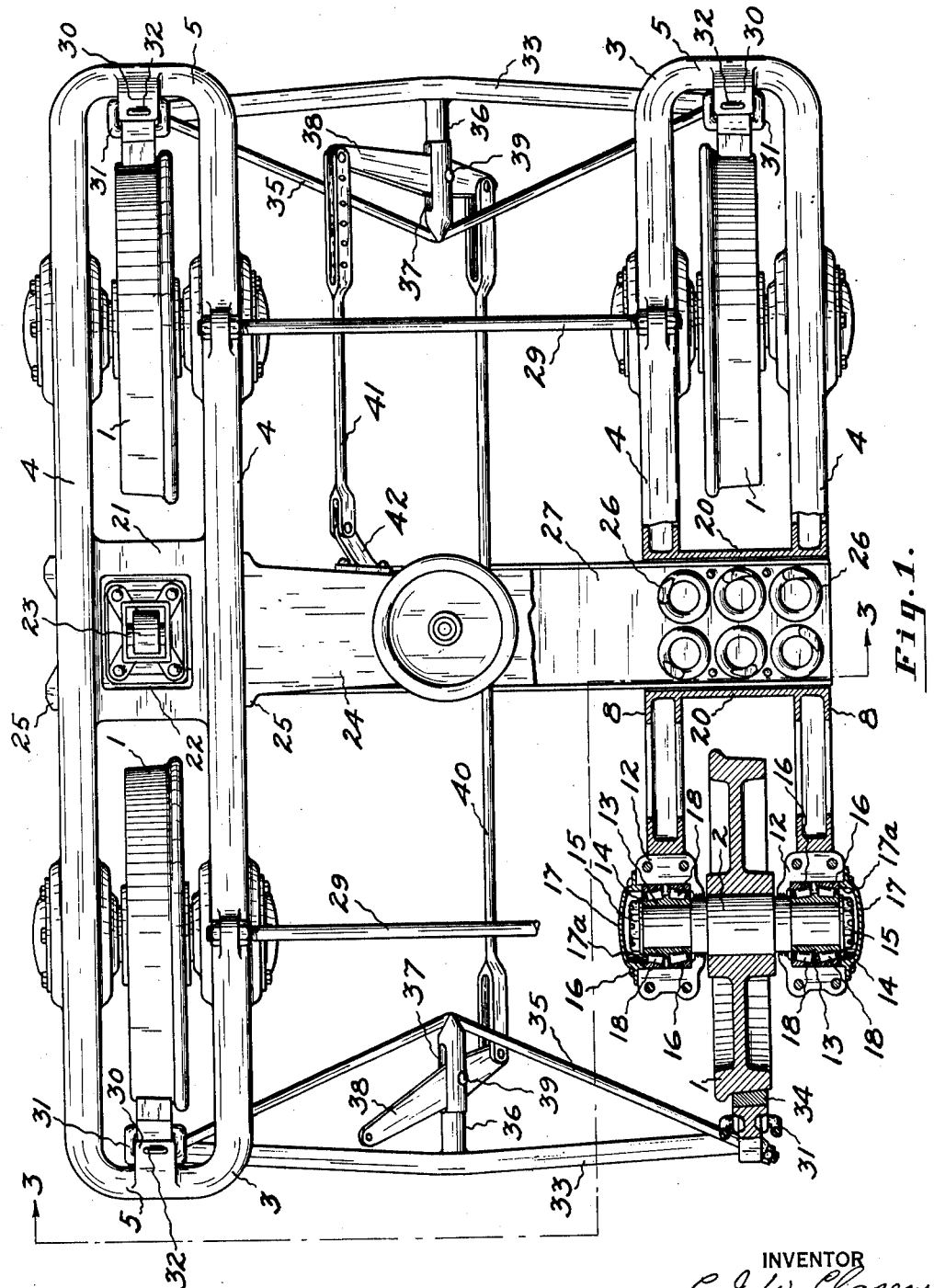

Referring to the accompanying drawings, the truck wheels 1 are flanged car wheels and each is mounted on a separate short axle 2, the wheels at each side of the truck being mounted in a separate side frame which is preferably in the form of a one piece casting. Each of the two side frames has spaced parallel longitudinal side members 4 which are joined by integral end portions 5. Each side member has an arched top chord 6 and a bottom chord 7 of truss form. The top and bottom chords 6 and 7 are joined by integral columns 8 which are spaced apart to provide a central bolster receiving opening 9 and the columns are so formed that the lower portion 9ª of the opening is somewhat wider than the upper portion of the opening to permit insertion and removal of a bolster. While the frame members as shown herein are U shaped in section, it is obvious that the frame member may be L shaped or T shaped if desired. The inclined end portions of the bottom chord 7 terminate short of the ends of the side members to provide end portions 10 which overlie the axles 2 on opposite sides of the supporting wheels. The side members 4 of each of the frames are spaced apart sufficiently to permit mounting of the wheels 1 between them and the side members are provided adjacent the ends of the bottom chords 7 with bearing portions adapted to receive the wheel axles. Each extension 10 is provided on its under side with a semi-cylindrical recess 11 forming a half bearing and bolted to the under side of the extension is a complemental bearing retaining member 12 which completes the cylindrical opening in the frame in which the axle bearing is mounted. Each axle 2 has bearing collars 13 mounted upon its opposite ends and held in place thereon by washers 14 and nuts 15. The outer race rings 16 fit within the cylindrical openings in the frame formed by the recess 11 and removable bearing retaining member 12 and these race rings are retained within the openings by means of caps 17 bolted to the outer faces of the side members, each cap 17 being provided wth a cylindrical flange 17ª, which fits within the frame opening and bears against the outer race ring. The bearing collar and the outer race rings are each provided with oppositely inclined conical raceways and in these raceways are mounted bearing rollers 18, which not only serve to center the axles, but also take end thrusts and prevent endwise movements of the axles.

The side members of the frame are integrally joined adjacent the center of the frame as well as at the opposite ends thereof, the central integral connecting portions lying between the front and rear wheels mounted in the frame. The central connecting portions are in the form of transverse webs integral with the side members and extending around the bolster receiving opening. The bottom chords 7 are joined by a web 19, which is preferably flush with the upper top surfaces of the chords 7 and forms the bottom of the bolster receiving opening. The connection between the bottom chords may include integral stiffening ribs 19ª which extend from the under side of the web 19 to the plane of the lower faces of the chords 7. Integral webs 20 join the columns 8 at the opposite sides of the bolster receiving opening and these webs form the opposite sides of the bolster receiving opening. The top chords 6 are joined by an integral web 21 extending across the top of the bolster receiving opening and this web is provided with an opening 22 through which the side bearings 23 of the bolster may project. The bolster 24 is yieldably supported on the frame members and it is to be understood that, in so far as the present invention is concerned, various bolster supporting and guiding means may be employed in which the bolster may be directly guided in the frame members or in which the guiding and supporting means permit a certain amount of lateral movement of the bolster with respect to the frame members. The bolster 24 is provided with vertical guide ribs 25 at the opposite ends thereof, which overlie the outer sides of the columns 8 of the inner and outer side members of each of the two side frames. The bolster 24 is supported at its opposite ends by compression coil springs 26 which are interposed between the under side of the bolster and a spring plank 27 which rests at its opposite ends upon the bottom chords 7 and connecting webs 19 of the two side frames. The spring plank 27, which is preferably of channel shape is attached to the webs 19 by suitable means such as rivets 27ª and is provided with openings which receive short lugs 28 formed integral with the webs 19, which serve to rigidly interlock the spring plank with each of the two side frames, the spring plank forming a rigid tie between the central portions of the frames. The two frames may be connected toward the ends thereof, if desired, by means of tie rods 29, which assist the spring plank 27 in securely tying the two side frames together.

The integral connection portions 5 at the opposite ends of each frame are provided with integral brake beam supporting brackets 30 from which are suspended links 31, which are held in place in the brackets 30 by means of retaining pins 32 and which carry brake beams 33 at their lower ends. The brake beams 33 carry at their opposite ends brake shoes 34, which are adapted to engage the treads of the adjacent wheels. Each brake beam is provided with a truss rod 35 which is adjustably connected with the ends of the beam and extends at its center over the outer end of a strut 36, which is rigidly attached to the brake beam. Each strut 36 is provided with a transverse slot 37 through which extends a lever 38 which is connected to the strut by means of a pivot 39. The lower ends of the two levers 38 are connected by means of a link 40, the upper end of one of the levers may be connected by any suitable means with the brake operating mechanism on the car and the upper end of the other lever is connected by a short link 41 to a bracket 42 attached to the bolster 24. The brake beams 33 are so suspended that the brake shoes are held clear of the supporting wheels, but when the levers 38 are actuated, both brake beams are swung inwardly toward the wheels to apply the brake shoes to the treads of the wheels.

By providing side frames in the form of one piece castings, which are interchangeable, the manufacture of the truck is simplified and the cost of manufacture is materially reduced. By mounting the wheels independently on short axles, the heavy cross axles commonly employed are eliminated and a frame of ample strength may be provided without increasing the weight of the truck over the weight of a standard truck of the type having cross axles. By providing the removable bearing retaining members on each of the side frames, any wheel can be removed and replaced by simply jacking up one end of the truck. The mounting of the brake beams at the opposite ends of the truck is very advantageous in that it brings the brakes to a position in which they are readily accessible for replacement or repair. Furthermore, the placing of the brake beams at the ends instead of at the center of the truck provides a wider space at the center for the support of the bolster and permits shortening of the wheel base when this is desirable.

It will also be apparent that the provision of thrust roller bearings for the axles in each rigid side frame reduces the lateral play of the wheels to a minimum and materially reduces flange wear. The independent mounting of the wheels reduces wear on the treads of the wheels in passing around curves and over truck irregularities and the roller bearings substantially eliminate the bearing friction.

Figure 4:
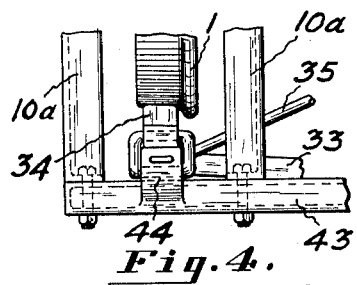
Figs. 4 and 5 are a fragmentary plan view and a fragmentary side elevation respectively showing a modified frame construction.
Figure 5:
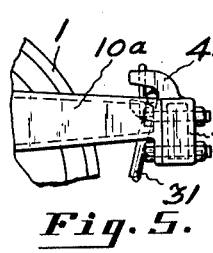

In Figs. 4 and 5 of the drawing, there is shown a modified frame construction in which the extending portions 10ª of the side members of the frames are not integrally joined at their outer ends, but are rigidly connected by a rigid end member 43 which is bolted to each of the extensions and rigidly connects the two side frames at the end of the truck. In this modification, the brake beam supporting brackets 44 are formed integrally with the end member 43 instead of with the side frame members.

Figure 6:
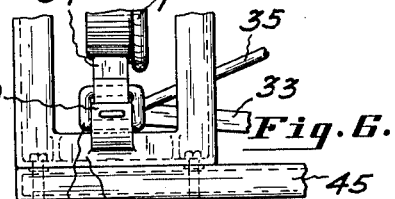

In Figs. 6 and 7 of the drawing, there is shown a modified construction in which the integral end portions of the frames are provided with a flat outer face to which is bolted a rigid cross member 45 which connects the two frames at each end of the truck.

Figure 2:
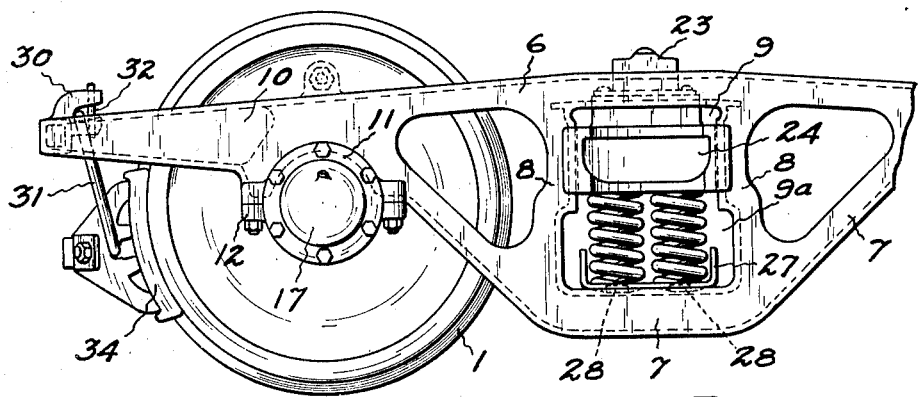
Fig. 2 is a fragmentary side elevation of the truck.
Figure 3:
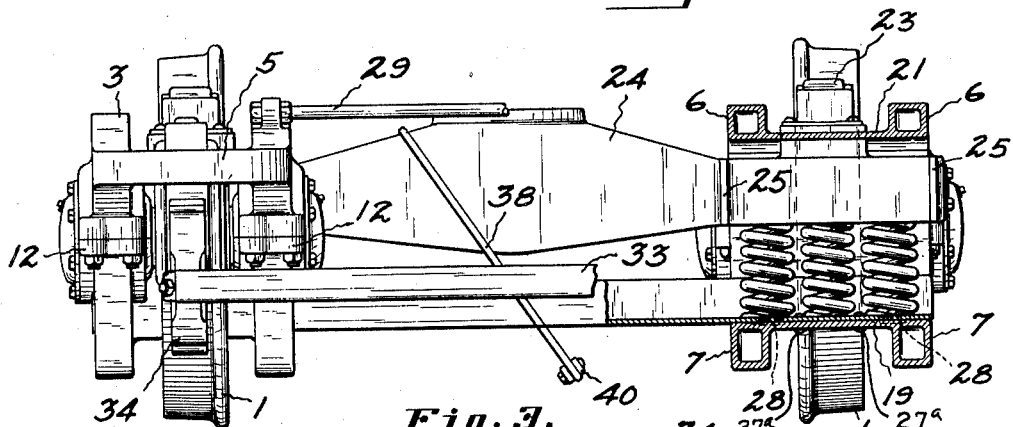
Fig. 3 is an end elevation of the truck partially in section on the line indicated at 3—3 in Fig. 1.
Figure 9:
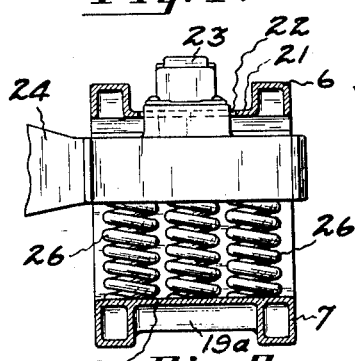
Figs. 8 and 9 are a fragmentary side elevation and a transverse section respectively showing the bolster support employed in frame structures such as shown in Figs. 4 to 7, inclusive, Fig. 9 being a section taken on the line indicated at 9—9 in Fig. 8.
Figure 8:
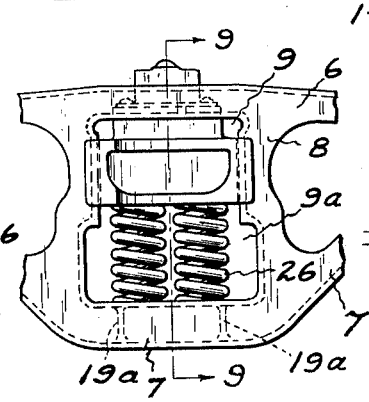

In each of the two modifications shown in Figs. 4 to 7, the two frames of the truck are in the form of one piece castings in which the side members of the frames are joined centrally thereof by integral webs as shown in Figs. 1 to 3. In these modifications, however, the two side frames are rigidly connected at their opposite ends by means of the end members and the spring plank 27 may be omitted, the bolster supporting springs in this case being supported directly upon the transverse connecting webs 19 forming the bottoms of the bolster receiving openings, as shown in Figs. 8 and 9 of the drawing.

It will be seen that the pairs of frame members rigidly connected together and to the spring plank provide a rugged construction which may be of relatively light weight.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. A truck having side frames, each comprising spaced longitudinal side members adapted to receive the wheels between them and provided with axle receiving portions intermediate the center and ends of the frame, integral connecting portions joining said side members adjacent the centers thereof, and a spring plank rigidly connecting the central portions of the frames.

2. A truck having side frames, each comprising spaced longitudinal side members adapted to receive the wheels between them and provided with axle receiving portions intermediate the center and ends of the frame, integral connecting portions joining said side members adjacent the centers thereof, and at the opposite ends of the frame, and a spring plank rigidly connecting the central portions of the frames.

3. A side frame for trucks comprising spaced longitudinal side members adapted to receive the wheels between them and provided with axle receiving portions intermediate the center and ends of the frame, said frame having a bolster receiving opening substantially midway between the ends thereof, and integral webs alongside the bolster opening joining the side members.

4. A side frame for trucks comprising spaced longitudinal side members adapted to receive the wheels between them and provided with axle receiving portions intermediate the center and ends of the frame, said frame having a bolster receiving opening substantially midway between the ends thereof, vertical webs integral with the side members at opposite sides of the bolster receiving opening, and a spring supporting web at the bottom of the said opening integral with said side members.

5. A one piece side frame for trucks comprising spaced longitudinal side members, each having a top chord and a truss shaped bottom chord, and spaced integral columns connecting the top and bottom chords and forming between them a bolster receiving opening, said side members having axle receiving portions adjacent opposite ends of the bottom chords, integral webs joining the columns of the two side members, and an integral web joining the bottom chords.

6. A one piece side frame for trucks comprising spaced longitudinal side members, each having a top chord and a truss shaped bottom chord, and spaced integral columns connecting the top and bottom chords and forming between them a bolster receiving opening, said side members having axle receiving portions on the under sides thereof beyond the ends of the bottom chord, and having extending integrally connected end portions, integral webs joining the columns of the two side members and forming the sides of the bolster opening and an integral web joining the bottom chords and forming the bottom of the bolster opening.

7. A one piece side frame for trucks comprising spaced longitudinal side members integrally joined at the ends thereof and adjacent the center, said side members having axle receiving portions intermediate the integrally connected portions thereof, and a brake beam supporting member formed integrally with the frame at each end thereof.

8. A truck having two identical side frames each in the form of an integral casting having laterally spaced longitudinal members adapted to receive the supporting wheels between them and having transversely alined axle receiving portions, each frame having centrally thereof, a bolster receiving opening, and means for holding the frames in parallel relation.

9. A truck having two identical side frames each in the form of an integral casting having laterally spaced longitudinal members adapted to receive the supporting wheels between them and having transversely alined axle receiving portions, each frame having centrally thereof, a bolster receiving opening, and end members rigidly connecting said side frames.

10. A truck having two identical side frames each in the form of an integral casting having laterally spaced longitudinal members adapted to receive the supporting wheels between them and having transversely alined axle receiving portions, each frame having centrally thereof, a bolster receiving opening, end members rigidly connecting said side frames, and a spring plank rigidly connecting the central portions of said side frames.

In testimony whereof I affix my signature.

CLAUS J. WERNER CLASEN.